United States Patent
Fong et al.

(10) Patent No.: US 7,492,539 B2
(45) Date of Patent: Feb. 17, 2009

(54) METHOD FOR CONTROLLING A BURNISH CYCLE TO MINIMIZE CYCLE TIME

(75) Inventors: Walton Fong, San Jose, CA (US); Donald R. Gillis, San Jose, CA (US); Vedantham Raman, Morgan Hill, CA (US); Kris Schouterden, San Jose, CA (US); Mike Suk, San Jose, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 498 days.

(21) Appl. No.: 10/813,562

(22) Filed: Mar. 30, 2004

(65) Prior Publication Data
US 2005/0218890 A1    Oct. 6, 2005

(51) Int. Cl.
*G11B 27/36* (2006.01)
*G11B 21/02* (2006.01)

(52) U.S. Cl. .............................. 360/31; 360/75; 360/66
(58) Field of Classification Search .................. None
See application file for complete search history.

(56) References Cited

U.S. PATENT DOCUMENTS

| | | | |
|---|---|---|---|
| 5,863,237 A * | 1/1999 | Felts et al. ............. | 451/41 |
| 6,046,871 A | 4/2000 | Schaenzer et al. | |
| 6,296,552 B1 * | 10/2001 | Boutaghou et al. ...... | 451/41 |
| 6,359,433 B1 * | 3/2002 | Gillis et al. ............. | 324/210 |
| 6,417,981 B1 * | 7/2002 | Smith ..................... | 360/31 |
| 6,577,466 B2 * | 6/2003 | Meyer et al. ............ | 360/75 |
| 6,707,631 B1 * | 3/2004 | Haddock .................. | 360/75 |
| 6,760,174 B2 * | 7/2004 | Forehand ................. | 360/53 |
| 7,023,632 B1 * | 4/2006 | Egan et al. ............... | 360/31 |
| 7,054,084 B2 * | 5/2006 | Fong et al. .............. | 360/31 |
| 7,194,802 B2 * | 3/2007 | Fayeulle et al. ......... | 29/737 |
| 2003/0058559 A1 * | 3/2003 | Brand et al. ............. | 360/31 |
| 2004/0085670 A1 * | 5/2004 | Li et al. .................. | 360/75 |
| 2005/0044696 A1 * | 3/2005 | Fong et al. .............. | 29/603.03 |

* cited by examiner

*Primary Examiner*—Wayne R Young
*Assistant Examiner*—Dismery Mercedes
(74) *Attorney, Agent, or Firm*—Merchant & Gould

(57) ABSTRACT

A method for controlling a burnish cycle to minimize cycle time is disclosed. MR sensor resistance measurements are used to monitor interference with the recording surface and when clearance is not detected, steps are taken to fine tune the interference signal.

15 Claims, 7 Drawing Sheets

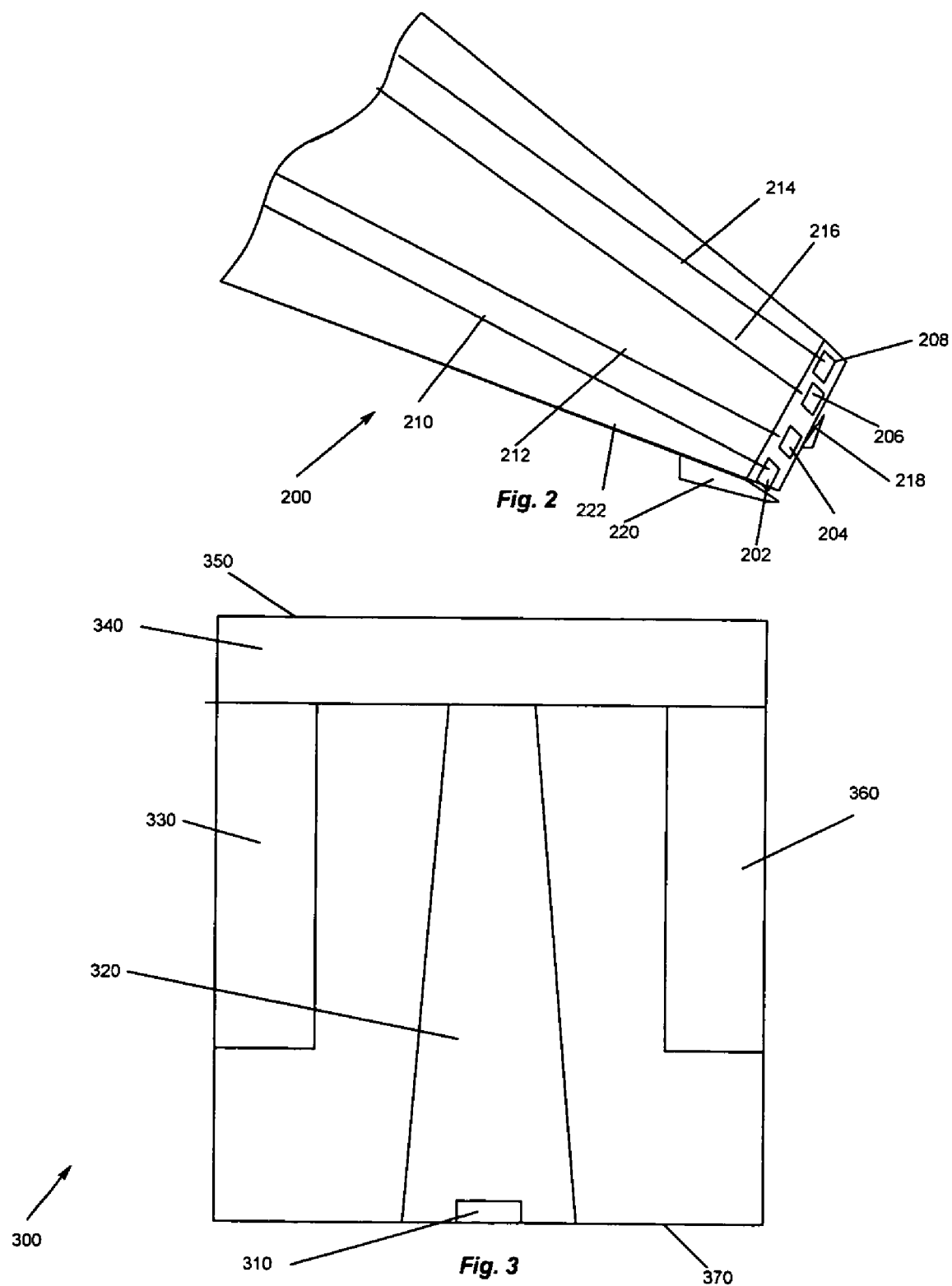

METHOD FOR CONTROLLING A BURNISH CYCLE TO MINIMIZE CYCLE TIME

BACKGROUND OF THE INVENTION

1. Field of the Invention

This invention relates in general to the manufacture of storage disks used in the computer field, and more particularly to a method for controlling a burnish cycle to minimize cycle time.

2. Description of Related Art

Hard disks are used to store information, typically coded information, utilized for data processing. An advantage of such a disk is that it can provide high-speed random access to data stored thereon. Information may be read from or written to any selected area on the memory surface of such a disk. The reading or writing of data may be performed without having to serially search the full contents of the disk to have access to a selected memory location. Generally, a hard disk is mounted with a disk drive, which includes a motor for rotating the hard disk and an actuator for moving a transducer relative to the surface of the rotating hard disk to provide access to circumferential tracks on the hard disk. A plurality of disks may be mounted on a single spindle in spaced relationship to one another and transducers are provided to interact with opposite planar surfaces of each of the disks.

The disks are typically magnetic disks, which include a magnetic surface for recording information thereon. Moreover, the heads that interact with each of the surfaces are referred to as "flying heads." Thus, the flying heads do not touch the surface of the disk during the rotation of the disk. Instead, the flying heads ride on an air bearing that is created between the slider and the disk. The air bearing prevents wear of either the head or the disk surface by reducing or eliminating contacts as the head and the disk surface experience relative movement. Wear of the disk surface due to contact results in the loss of information stored on the magnetic disk.

The transducer head is typically in the form of a magnetoresistive (MR) head or element carried on a slider body. Oftentimes, the slider and transducer are designated as a "head." Regardless, the slider body is mounted to a flexible suspension portion of an arm assembly that is otherwise part of the actuator assembly. Upon final assembly, the actuator assembly positions the slider over a surface of a disk. The slider is configured such that as the disk rotates, an air bearing develops between the slider and the disk surface causing the slider, and thus the read and write elements, to lift and fly several micro inches above the disk surface. The distance between the slider and the disk surface is often times referred to as a "fly height." In magnetic recording technology it is desired to "fly" the slider as closely as possible to the disk surface (i.e., minimal fly height) so that the read transducer can distinguish between the magnetic fields emanating from closely spaced regions on the disk.

Disk drive manufacturers constantly strive to improve upon the slider design to provide a minimized fly height, along with satisfying other constraints as slider roll, pitch, and skew. These features are typically accomplished by forming (e.g., etching) aerodynamic rails or pads into the slider body. These rails must be machined to exacting standards, and constitute permanent structures. That is to say, the rails or pads will not erode or otherwise change shape upon expected or unexpected contact with the disk surface. In contrast, a recently developed slider configuration incorporates a burnishable slider air bearing surface (ABS). Unlike traditional slider rail or pad constructions, a burnishable slider design relies upon reshaping of the slider ABS upon contact with the rotating disk to achieve a final shape and fly height.

As a point of reference, the body of a burnishable slider is formed to have generally linear or planar side and bottom surfaces, but the ABS may have an enlarged height or thickness. More particularly, in conjunction with other disk drive parameters, including configuration of the actuator arms and other slider components, such as a slider body support structure, the slider ABS is normally formed to a thickness slightly greater than the expected final thickness that would otherwise produce a desired fly height. In other words, upon final assembly of the disk drive and initial rotation of the disk at normal operation speeds, the slider continues to contact or rub against the relevant disk surface. Because the slider ABS is made of a burnishable material, continued contact between the slider and the rotating disk burnishes the slider, thereby reducing its height. In theory, this burnishing procedure continues until the slider thickness has been reduced to a point where slider just begins to fly relative to the disk surface. This results in fly height that theoretically is as small as possible.

The above-described burnishable slider design appears highly viable. The exacting manufacturing tolerances required of conventional slider pad or rail designs is eliminated, and a highly minimized fly height can be achieved. However, opportunities for improvement exist. The current technique for burnishing the slider produces a slider height profile that is essentially co-planar with the disk surface. For disk drive applications, this shape is less than aerodynamically optimal. Burnishable slider technology represents a distinct advancement in the disk drive art. Certain opportunities exist for perfecting implementation of this technology, including an optimal burnishment methodology.

It can be seen that there is a need for a method for controlling a burnish cycle to minimize cycle time.

SUMMARY OF THE INVENTION

To overcome the limitations in the prior art described above, and to overcome other limitations that will become apparent upon reading and understanding the present specification, the present invention discloses a method for controlling a burnish cycle to minimize cycle time.

The present invention solves the above-described problems by using MR sensor resistance measurements to monitor interference with the recording surface and when clearance is not detected, steps are taken to fine tune the interference signal.

A method in accordance with the principles of the present invention includes performing an initial MR resistance measurement for a head, determining whether the measured MR resistance indicates the head has clearance and completing the test cycle when the head is determined to have clearance.

In another embodiment of the present invention, a drive controller for minimizing the cycle time of a burnish cycle is provided. The drive controller includes memory for storing data therein and a processor, coupled to the memory, wherein the processor is configured for performing an initial MR resistance measurement for a head, determining whether the measured MR resistance indicates the head has clearance and completing the test cycle when the head is determined to have clearance.

In another embodiment of the present invention, a program storage device readable by a computer tangibly embodies one or more programs of instructions executable by the computer to perform operations for minimizing the cycle time of a burnish cycle is provided. The operations include performing an initial MR resistance measurement for a head, determine whether the measured MR resistance indicates the head has clearance and completing the test cycle when the head is determined to have clearance.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 2 illustrates a slider mounted on a suspension according to an embodiment of the present invention;

FIG. 3 illustrates an ABS view of the slider and the magnetic head according to an embodiment of the present invention;

DETAILED DESCRIPTION OF THE INVENTION

In the following description of the exemplary embodiment, reference is made to the accompanying drawings, which form a part hereof, and in which is shown by way of illustration the specific embodiment in which the invention may be practiced. It is to be understood that other embodiments may be utilized as structural changes may be made without departing from the scope of the present invention.

The present invention provides a method for controlling a burnish cycle to minimize cycle time. MR sensor resistance measurements are used to monitor interference with the recording surface and when clearance is not detected, steps are taken to fine tune the interference signal.

Figure 1:
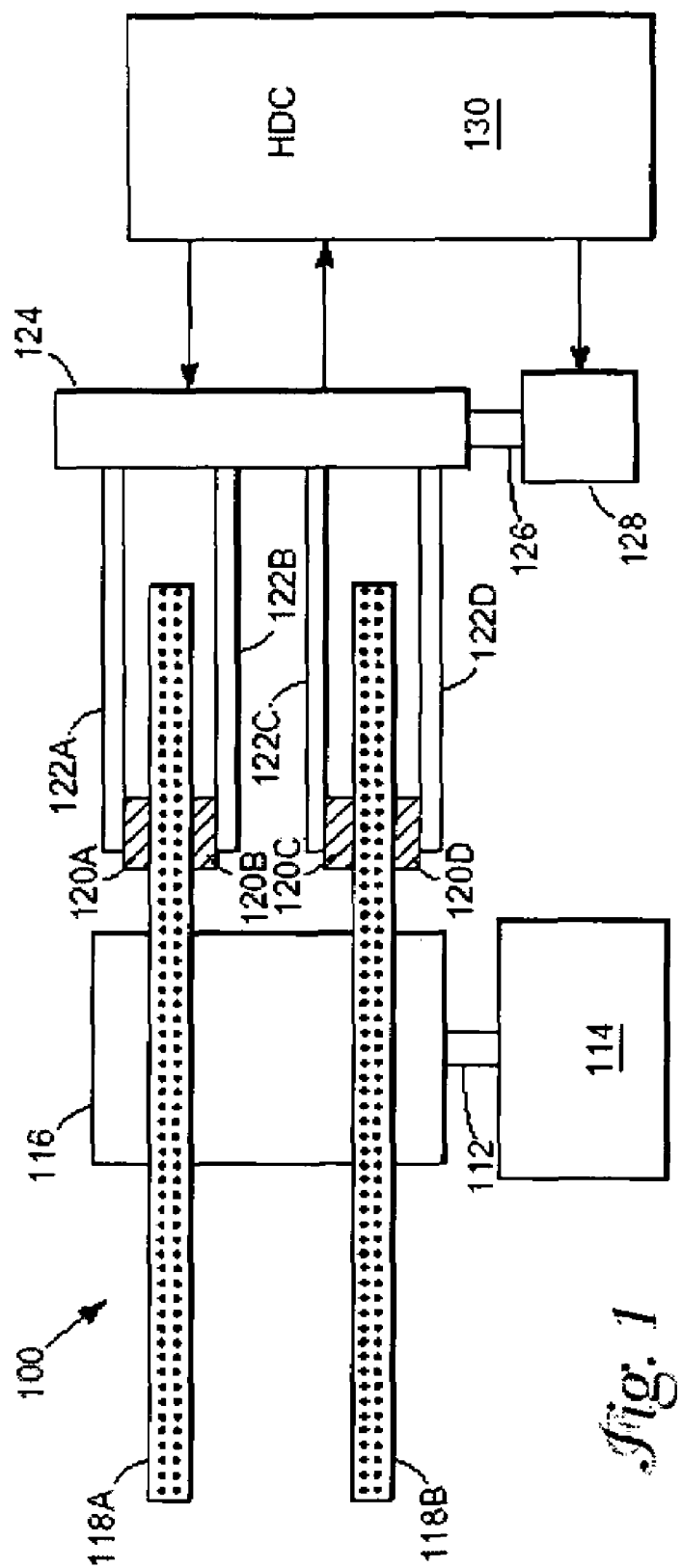
FIG. 1 illustrates a hard disk drive including disks according to the present invention.

FIG. 1 illustrates a hard disk drive (HDD) 100 including disks 118A, 118B according to the present invention. The HDD 100 includes a disk 118 and a hard disk controller (hereinafter referred to as HDC) 130. The disk part has a motor 114 for rotating a shaft 112 at a high speed. A cylindrical support 116 is attached to the shaft 112 so that the axes are in coincidence. One or more information recording disks 118A and 118B are mounted between supports 116. Magnetic heads 120A, 120B, 120C and 120D are respectively provided to face the disk surface, and these magnetic heads are supported from an actuator 124 by access arms 122A, 122B, 122C, and 122D, or actuators, respectively. The individual magnetic heads 120A to 120D receive the drive force transmitted from an actuator drive device 128 by a shaft 126 and rotates about the shaft 126 as the axis of rotation, and fly over the disk 118 to a predetermined position.

Access arms 122A, 122B, 122C, and 122D suspend magnetic heads 120A, 120B, 120C, 120D above disk 118A, 118B. Upon initialization of actuator 124, access arms 122A, 122B, 122C, and 122D causes magnetic heads 120A, 120B, 120C, 120D to move over the surface of disk 118A, 118B. When disk 118A, 118B rotates, magnetic heads 120A, 120B, 120C, 120D will fly above disk 118A, 118B on a small film of air (air bearing).

FIG. 2 illustrates a suspension system 200 including a slider 220 mounted on suspension 222. First and second solder connections 202 and 208 connect leads from the sensor 218 to leads 210 and 214, respectively, on suspension 222 and third and fourth solder connections 204 and 206 connect to the write coil (not shown) to leads 212 and 216, respectively, on suspension 222.

FIG. 3 is an ABS view of slider 300 and magnetic head 310. The slider has a center rail 320 that supports the magnetic head 310, and side rails 330 and 360. The support rails 320, 330 and 360 extend from a cross rail 340. With respect to rotation of a magnetic disk, the cross rail 340 is at a leading edge 350 of slider 300 and the magnetic head 310 is at a trailing edge 370 of slider 300.

In conjunction with other disk drive parameters, including configuration of the actuator arms and other slider components, such as a slider body support structure, the air bearing surface of a slider is normally formed to a thickness slightly greater than the expected final thickness that would otherwise produce a desired a fly height. In other words, upon final assembly of the disk drive and initial rotation of the disk at normal operation speeds, at least a portion of the air bearing surface of a slider continues to contact or rub against the relevant disk surface. Because at least a portion of the air bearing surface of a slider is made of a burnishable material, continued contact between the air bearing surface of a slider and the rotating disk burnishes at least a portion of the air bearing surface of a slider, thereby reducing its height. In theory, this burnishing procedure continues until the thickness of the structure of the air bearing surface of a slider has been reduced to a point where the air bearing surface of a slider just begins to fly relative to the disk surface. This results in fly height that theoretically is as small as possible.

According to an embodiment of the present invention, a baseline measurement of resistance for a sensor of a disk drive may be obtained and compared with subsequent measurements of resistance to identify a detrimental change to the at least one sensor is processed. A resistance variation detector may therefore quantify the resistance of the MR head as a function of contact with the recording surface.

Figure 4:
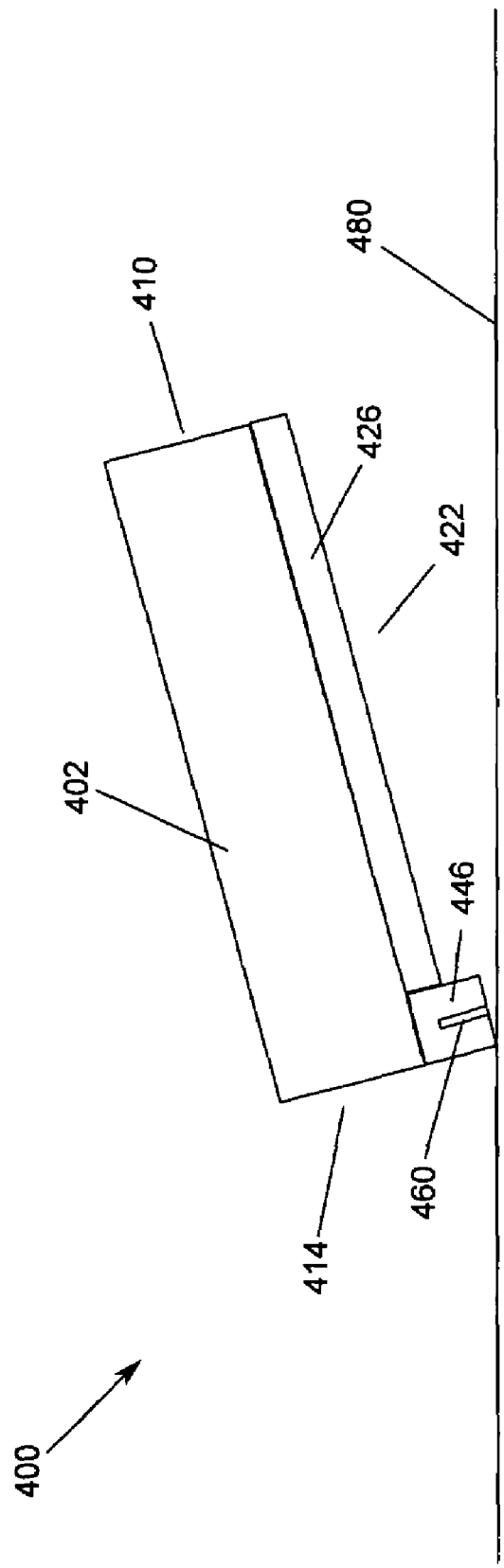
FIG. 4 depicts a slider that may be used by a head of a storage system according to an embodiment of the present invention.

FIG. 4 depicts a slider 400 which may be used by a head of a storage system according to an embodiment of the present invention. The slider 400 includes a slider body 402. The slider body 402 includes: a leading edge 410 and a trailing edge 414.

The slider body 402 includes a lower surface 422, which at least generally projects toward a recording surface 480. Spacing between the slider 400 and the recording surface 480 is maintained during normal disk drive operations (e.g., reading/writing information from/to the recording surface 480) by including an air bearing surface or ABS system 426 on the low surface 422 of the slider body 402.

Air carried by the moving recording surface 480 is directed under the front of the ABS 426 to exert an upwardly directed lifting force thereon. At least one rear air bearing surface 446 is provided. Air carried by the moving recording surface 480 is directed under the rear ABS 446 to exert an uplifting force thereon. The rear air bearing surface 446 carries at least one transducer 460 for reading information from and/or writing information to the recording surface 480. Representative transducers 460 include magneto resistive (MR), giant magneto resistive (GMR), colossal MR, and older inductive transducers.

Prior to initialization, rear air bearing surface 446 is coplanar with the recording surface 480. Burnishing operations are executed on the rear air bearing surface 446 to remove portions of the rear air bearing surface 446. Thus, MR sensor resistance measurements may be used to monitor interference between the rear air bearing surfaces 446 and the recording surface 480, and when clearance is not detected, steps are taken to fine tune the interference signal.

Figure 5:
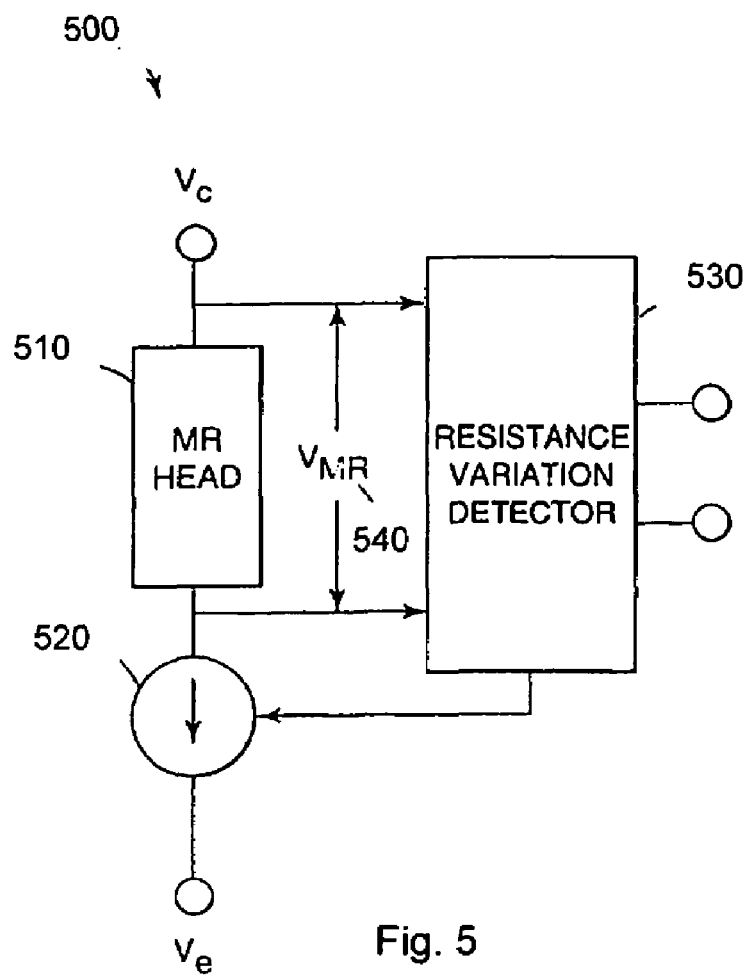
FIG. 5 illustrates a block diagram of a sensor for detecting changes in resistance of the MR head according to the present invention.

FIG. 5 illustrates a block diagram of a sensor 500 for detecting changes in resistance of the MR head according to the present invention. FIG. 5 illustrates a MR head 510 and a sense current source 520. The MR head 510 is supplied with a current by the sense current source 520. The resistance variation detector 530 monitors the resistance of the MR head 510 and controls the sense current source 520 providing the current flowing through the MR head 510. Thus, the resistance variation detector 530 can quantify the resistance of the MR head 510, which is equal to the voltage, $V_{MR}$ 540, across the MR head 510 divided by the current flowing therein.

Those skilled in the art will recognize that the present invention is not meant to be limited to the particular MR head resistance sensor 500 illustrated in FIG. 5, but that other variants are possible consistent with the teachings of the present invention. Moreover, the present invention may be applied to GMR heads and spin valve sensors as well.

Figure 6:
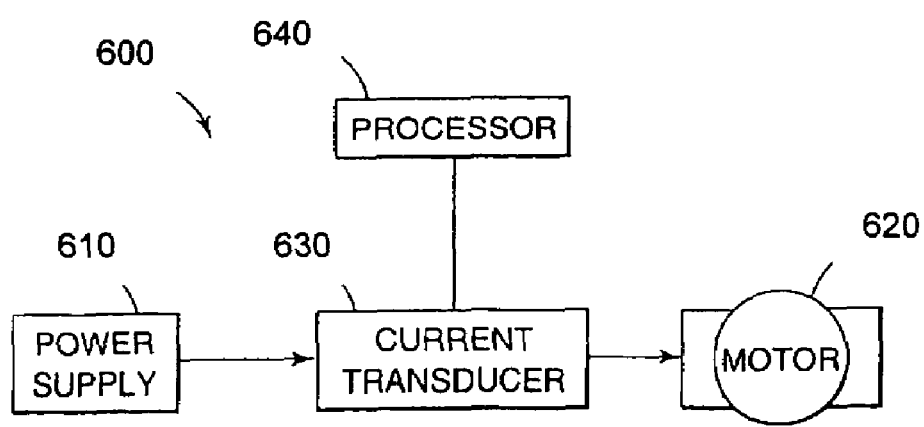
FIG. 6 illustrates a block diagram of a spindle motor current sensor according to the present invention.

FIG. 6 illustrates a block diagram of a spindle motor current sensor 600 according to the present invention. In FIG. 6, a power supply 610 provides current to drive the spindle motor 620. A current transducer 630 is disposed between the power supply 610 and the spindle motor 620 to detect the current being provided to the spindle motor 620. The current level parameter is provided to the processor 640 for processing. The processor 640 can then use the detected current level to corroborate MR head resistance changes that are detected using the MR resistance sensor 500 of FIG. 5.

Referring to FIGS. 5 and 6, resistance information obtained from resistance variation detector 530 may be used to adjust the medium-transducer velocity by adjusting current form power supply 610 that drives the spindle motor 620, or another characteristic of a slider in order to maintain a desired clearance between the slider and the medium. In addition to using the well known relationship between spindle speed and fly height, it is also possible to control the fly height of an MR head based on the pre-load force applied to the head by access arms 122A, 122B, 122C, and 122D as shown in FIG. 1. Slider pre-load or pitch angle, for example, may be adjusted, alone or in combination with a medium-transducer velocity, to maintain a given slider at a desired fly-height relative to the medium. Further, changes in the air pressure may result in changes in the fly-height. If a drive is operated with an increase in air pressure, the fly height of the heads may decrease.

Figure 7:
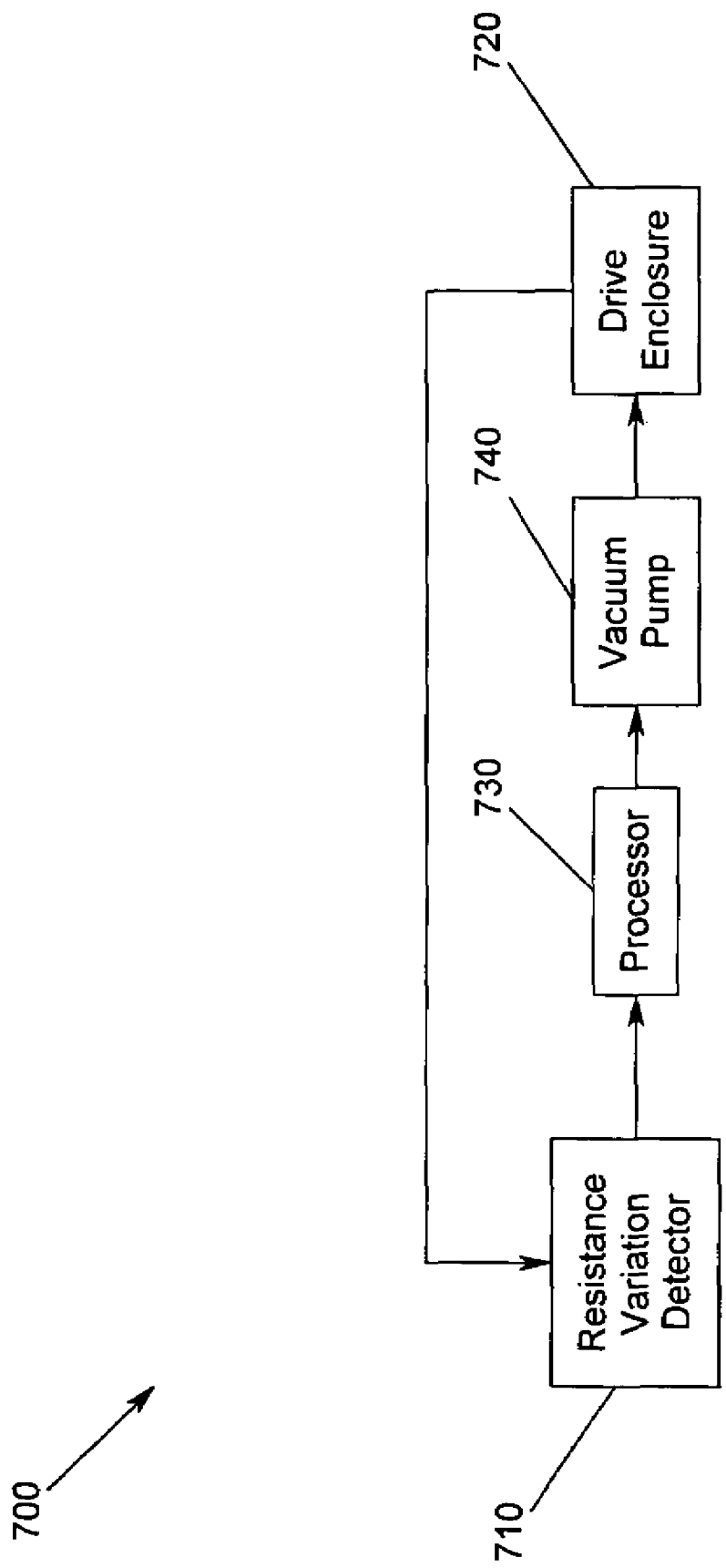
FIG. 7 illustrates a block diagram of a pressure sensor according to the present invention.

FIG. 7 illustrates a block diagram of a pressure sensor 700 according to the present invention. In FIG. 7, a resistance variation detector 710 is again used to indicate the clearance between the slider and the medium. The resistance variation detector 710 detects changes in resistance of a head of the drive enclosure 720. The resistance data is provided to the processor 730. The processor 730 controls a vacuum pump 740 that may be used to adjust the pressure within the drive enclosure 720 to minimize burnish cycle time.

Figure 8:
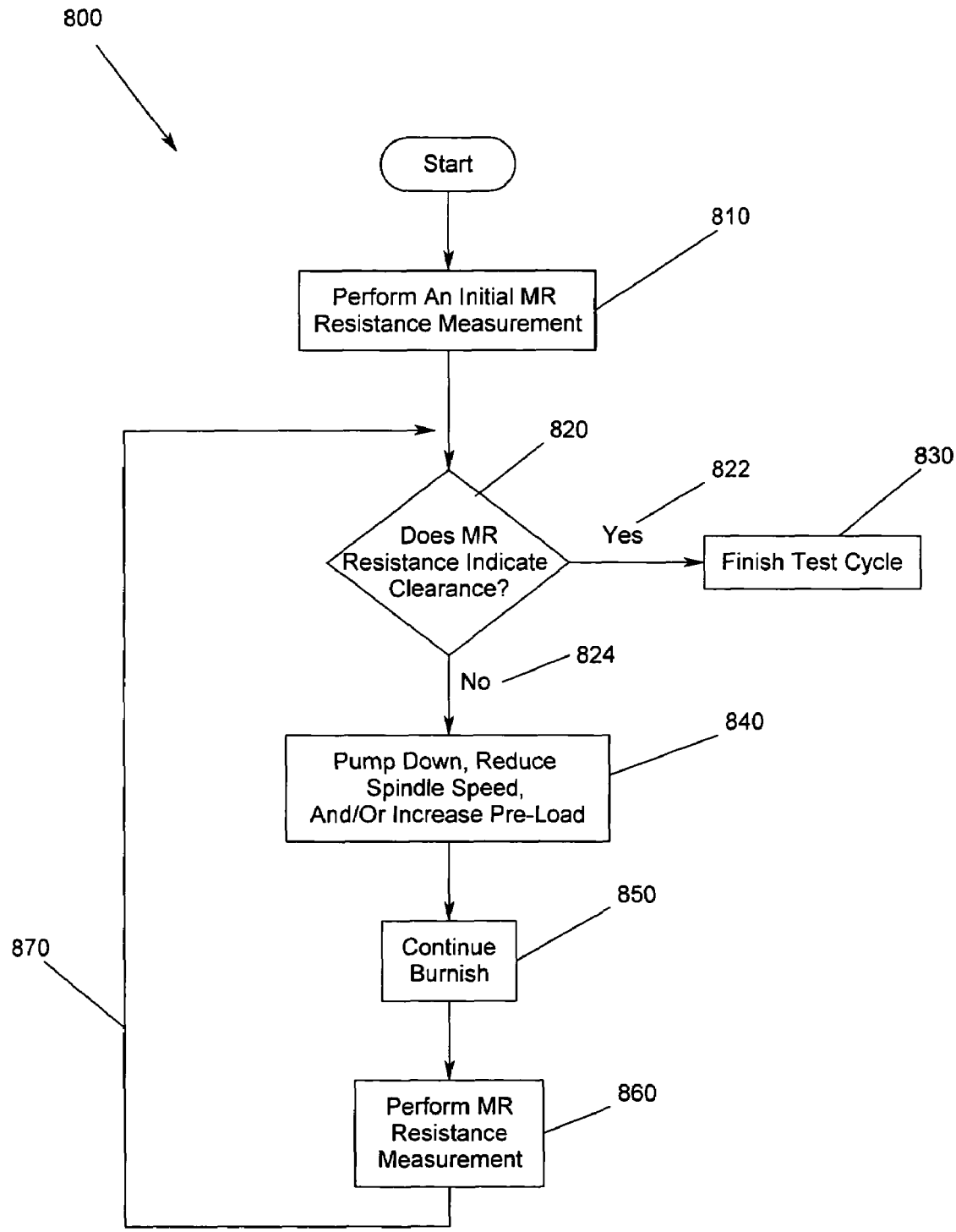
FIG. 8 is a flow chart of the method for controlling a burnish cycle to minimize cycle time.

FIG. 8 is a flow chart 800 of the method for controlling a burnish cycle to minimize cycle time. An initial MR resistance measurement is performed 810. A determination is made whether the MR resistance measurement indicates that the head has clearance over the recording medium 820. The absolute MR resistance measurements or the MR resistance change may be compared to a threshold to identify whether the head has clearance. If yes 822, the test cycle is completed 830. If not 824, steps are taken to further lower the head 840. For example, the intelligent use of a vacuum may be used to fine-tune the interference signal. Alternatively, or in conjunction, spindle speed and/or pre-load may be adjusted to fine tune the interference signal. Reducing the spindle speed will cause the head to fly lower. Moreover, increasing the pre-load will also cause the head to fly lower. After the adjustments are made, the burnish cycle is continued 850. Another MR resistance measurement is performed 860. The process again returns to determine whether the MR resistance measurement indicates that the head has clearance over the recording medium 870. Thus, the point of burnish completion is determined by monitoring the interference signal for the point of clearance by MR resistance (MRR) or MRR rate of change.

Figure 9:
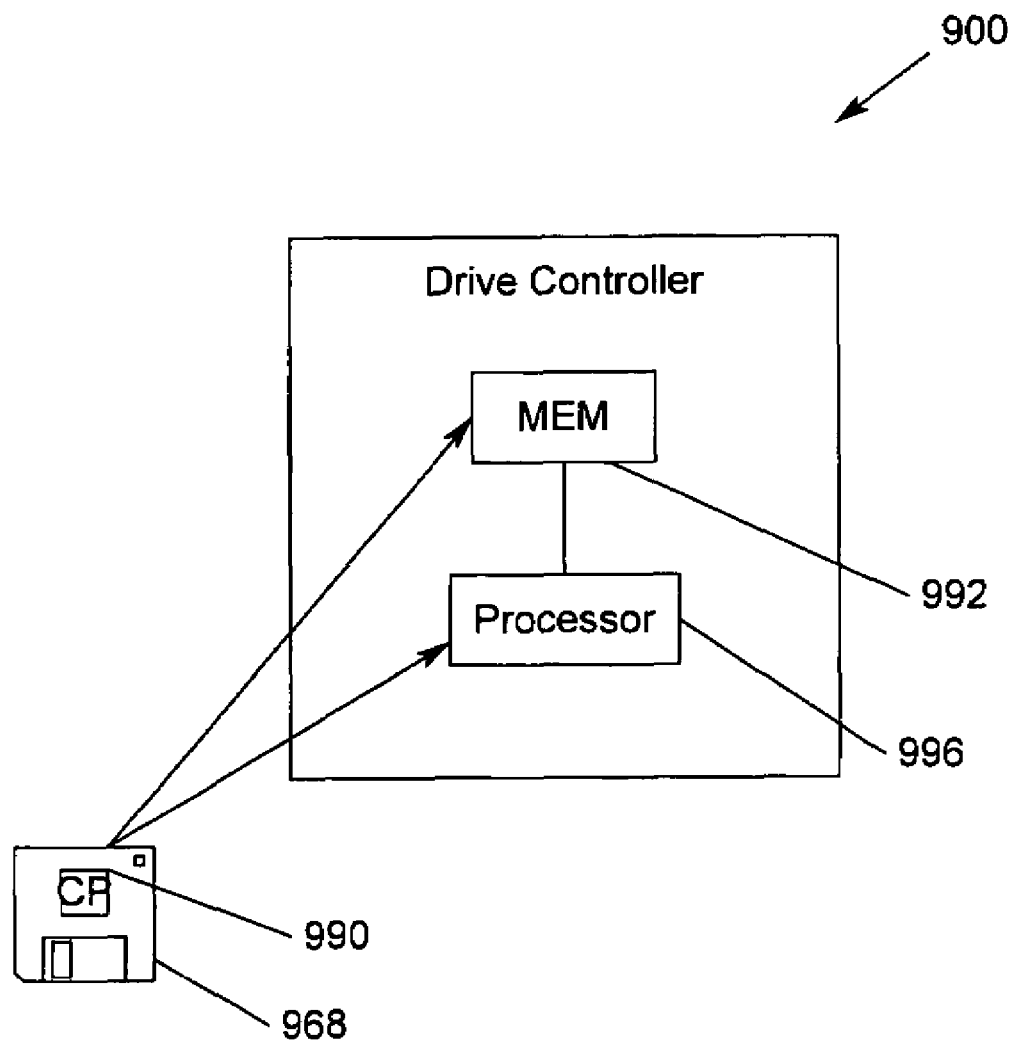
FIG. 9 illustrates the process illustrated with reference to FIGS. 1-7 tangibly embodied in a computer-readable medium or carrier for configuring a system according to the present invention.

FIG. 9 illustrates a system 900 according to the present invention, wherein the process illustrated with reference to FIGS. 1-8 may be tangibly embodied in a computer-readable medium or carrier, e.g. one or more of the fixed and/or removable data storage devices 968 illustrated in FIG. 9, or other data storage or data communications devices. A computer program 990 expressing the processes embodied on the removable data storage devices 968 may be loaded into the memory 992 or into the drive controller 900, e.g., in a processor 996, to configure the drive controller 900 of FIG. 9, for execution. The computer program 990 comprises instructions which, when read and executed by the drive controller 900 of FIG. 9, causes the drive controller 900 to perform the steps necessary to execute the steps or elements of the present invention The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for minimizing the cycle time of a burnish test cycle, comprising:
    prior to initialization, positioning a back portion of an air-bearing surface of a slider bearing a MR head to be co-planar with a recording surface;
    thereafter executing burnishing operations on the back portion of the air bearing surface to remove material from the back portion of the air-bearing surface;
    monitoring resistance measurements of the MR head representing interference between the air-bearing surface of the slider and the recording surface;
    determining whether the measured resistance of the MR head indicates the head has clearance between the air-bearing surface of the slider and the recording surface; and
    when clearance between the air-bearing surface of the slider and the recording surface is not detected based upon the monitoring of the resistance measurements of the MR head, lowering a fly-height between the back portion of the air-bearing surface of the MR head and the recording surface and executing burnishing operations on the back portion of the air bearing surface to remove material from the back portion of the air-bearing surface until the monitoring of the resistance measurements of the MR head indicates the air-bearing surface of the slider has clearance above the recording surface.

2. The method of claim 1 further comprising:

reducing the fly-height of the head when the measured resistance of the MR head indicates the head does not have clearance;

perform a subsequent burnish operation;

measuring the resistance of the MR head again; and returning to determine whether the measured resistance of the MR head indicates the MR head has clearance.

3. The method of claim 2, wherein the reducing the fly-height of the head further comprises selecting at least one process from the group comprising reducing the pressure within the disclosure, reducing the spindle speed and increasing the pre-load to the head.

4. The method of claim 1, wherein the determining whether measured resistance of the MR head indicates the head has clearance further comprises comparing the absolute resistance of the MR head measurements to a threshold to identify whether the head has clearance.

5. The method of claim 1, wherein the determining whether measured resistance of the MR head indicates the head has clearance further comprises comparing the resistance of the MR head rate of change to a threshold to identify whether the head has clearance.

6. A drive controller for minimizing the cycle time of a burnish test cycle, the drive controller comprising:

memory for storing data therein; and a processor, coupled to the memory, the processor being configured for, prior to initialization, positioning a back portion of an air-bearing surface of a slider bearing a MR head to be co-planar with a recording surface; thereafter for executing burnishing operations on the back portion of the air bearing surface to remove material from the back portion of the air-bearing surface, for monitoring resistance measurements of the MR head representing interference between the air-bearing surface of the slider and the recording surface, for determining whether the measured resistance of the MR head indicates the head has clearance between the air-bearing surface of the slider and the recording surface; and, when clearance between the air-bearing surface of the slider and the recording surface is not detected based upon the monitoring of the resistance measurements of the MR head, for lowering a fly-height between the back portion of the air-bearing surface of the MR head and the recording surface and executing burnishing operations on the back portion of the air bearing surface to remove material from the back portion of the air-bearing surface until the monitoring of the resistance measurements of the MR head indicates the air-bearing surface of the slider has clearance above the recording surface.

7. The drive controller of claim 6, wherein the processor is further configured for reducing the fly-height of the head when the measured resistance of the MR head indicates the head does not have clearance, perform a subsequent burnish operation, measuring the resistance of the MR head again and returning to determine whether the measured MR resistance indicates the head has clearance.

8. The drive controller of claim 7, wherein the processor reducing the fly-height of the head by selecting at least one process from the group comprising reducing the pressure within the disclosure, reducing the spindle speed and increasing the pre-load to the head.

9. The drive controller of claim 6, wherein the processor determines whether measured MR resistance indicates the head has clearance by comparing the absolute resistance of the MR head measurements to a threshold to identify whether the head has clearance.

10. The drive controller of claim 6, wherein the processor determines whether measured resistance of the MR head indicates the head has clearance by comparing the MR resistance rate of change to a threshold to identify whether the head has clearance.

11. A program storage device readable by a computer, the program storage device tangibly embodying one or more programs of instructions executable by the computer to perform operations for minimizing the cycle time of a burnish cycle, the operations comprising:

prior to initialization, positioning a back portion of an air-bearing surface of a slider bearing a MR head to be co-planar with a recording surface;

thereafter executing burnishing operations on the back portion of the air bearing surface to remove material from the back portion of the air-bearing surface;

monitoring resistance measurements of the MR head representing interference between the air-bearing surface of the slider and the recording surface;

determining whether the measured resistance of the MR head indicates the head has clearance between the air-bearing surface of the slider and the recording surface; and when clearance between the air-bearing surface of the slider and the recording surface is not detected based upon the monitoring of the resistance measurements of the MR head, lowering a fly-height between the back portion of the air-bearing surface of the MR head and the recording surface and executing burnishing operations on the back portion of the air bearing surface to remove material from the back portion of the air-bearing surface until the monitoring of the resistance measurements of the MR head indicates the air-bearing surface of the slider has clearance above the recording surface.

12. The program storage device of claim 11 further comprising:

performing burnish operations;

measuring an initial resistance of the MR head for a head;

determining whether the measured resistance of the MR head indicates the head has clearance; and completing the test cycle when the head is determined to have clearance.

13. The program storage device of claim 12, wherein the reducing the fly-height of the head further comprises selecting at least one process from the group comprising reducing the pressure within the disclosure, reducing the spindle speed and increasing the pre-load to the head.

14. The program storage device of claim 11, wherein the determining whether measured resistance of the MR head indicates the head has clearance further comprises comparing the absolute resistance of the MR head measurements to a threshold to identify whether the head has clearance.

15. The program storage device of claim 11, wherein the determining whether measured resistance of the MR head indicates the head has clearance further comprises comparing the resistance of the MR head rate of change to a threshold to identify whether the head has clearance.

* * * * *